(12) United States Patent
Young

(10) Patent No.: US 10,054,743 B2
(45) Date of Patent: Aug. 21, 2018

(54) INFRARED FIBER COMBINER

(71) Applicant: BAE SYSTEMS INFORMATION AND ELECTRONIC SYSTEMS INTEGRATION INC., Nashua, NH (US)

(72) Inventor: York E. Young, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/378,602

(22) Filed: Dec. 14, 2016

(65) Prior Publication Data

US 2018/0164507 A1 Jun. 14, 2018

(51) Int. Cl.
| | |
|---|---|
| *G02B 6/28* | (2006.01) |
| *G02B 6/04* | (2006.01) |
| *G02B 6/42* | (2006.01) |
| *G02B 6/38* | (2006.01) |
| *G02B 6/40* | (2006.01) |
| *G02B 6/14* | (2006.01) |

(52) U.S. Cl.
CPC .............. *G02B 6/2856* (2013.01); *G02B 6/04* (2013.01); *G02B 6/14* (2013.01); *G02B 6/3813* (2013.01); *G02B 6/3822* (2013.01); *G02B 6/40* (2013.01); *G02B 6/4296* (2013.01)

(58) Field of Classification Search
CPC ...... G02B 6/2856; G02B 6/04; G02B 6/4296; G02B 6/14; G02B 6/3822; G02B 6/40; G02B 6/102; G02B 6/3813
See application file for complete search history.

(56) References Cited

U.S. PATENT DOCUMENTS

| | | | | |
|---|---|---|---|---|
| 8,710,470 | B2* | 4/2014 | Gattass | .................. G02B 27/10 250/495.1 |
| 2009/0202204 | A1* | 8/2009 | Nielsen | ................ G02B 6/2551 385/43 |
| 2011/0123155 | A1* | 5/2011 | Kumkar | ............... G02B 6/2856 385/43 |

OTHER PUBLICATIONS

Domachuk, P., et al. "Over 4000 nm bandwidth of mid-IR supercontinuum generation in sub-centimeter segments of highly nonlinear tellurite PCFs." Optics Express 16.10 (2008): 7161-7168.
Mizaikoff, Boris. "Peer Reviewed: Mid-IR Fiber-Optic Sensors." Analytical chemistry 75.11 (2003): 258-A.

* cited by examiner

*Primary Examiner* — John M Bedtelyon
(74) *Attorney, Agent, or Firm* — Sand & Sebolt, LPA

(57) ABSTRACT

A light system may include a fused mid-IR tapered combiner to optically connect a bundle of mid-IR fiber bundles with a multimode fiber. The fused mid-IR fiber tapered combiner arranges a bundle of fibers in a geometric arrangement to reduce the diameter of a plurality of mid-IR fibers to match or equal the diameter of a single multimode mid-IR fiber. The mid-IR fibers carry light produced and emitted from semiconductor light sources.

20 Claims, 6 Drawing Sheets

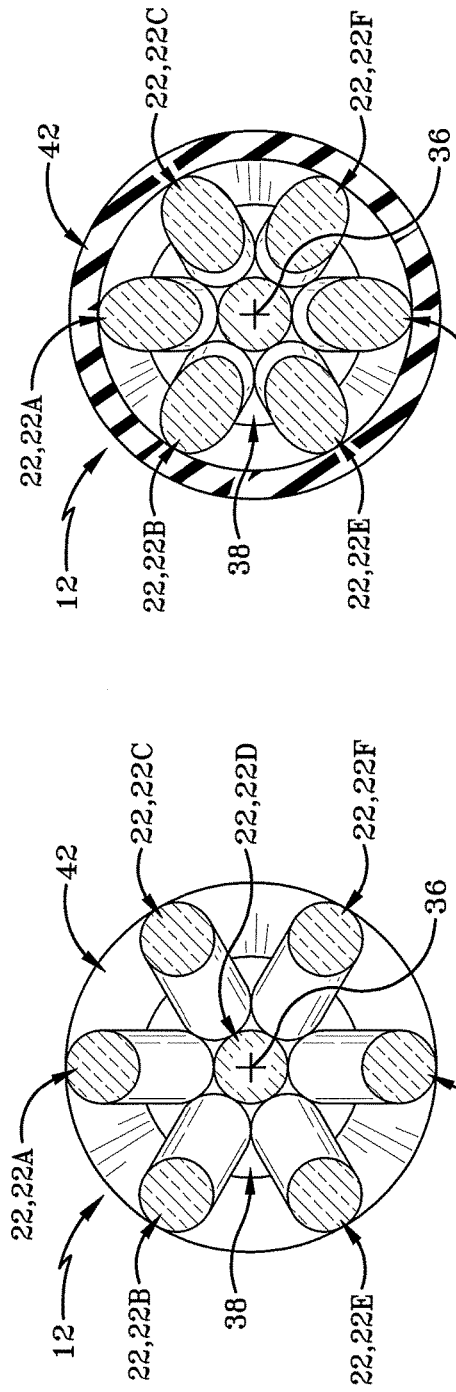
FIG.4
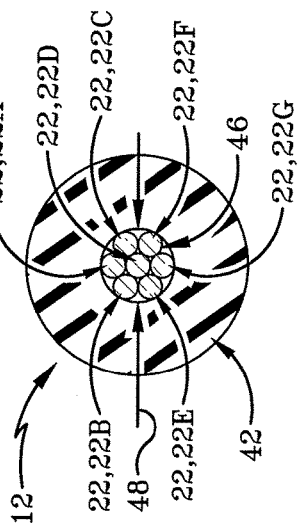
FIG.7
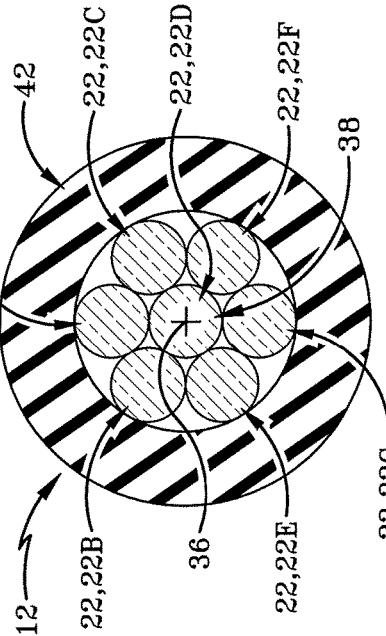
FIG.6
FIG.5

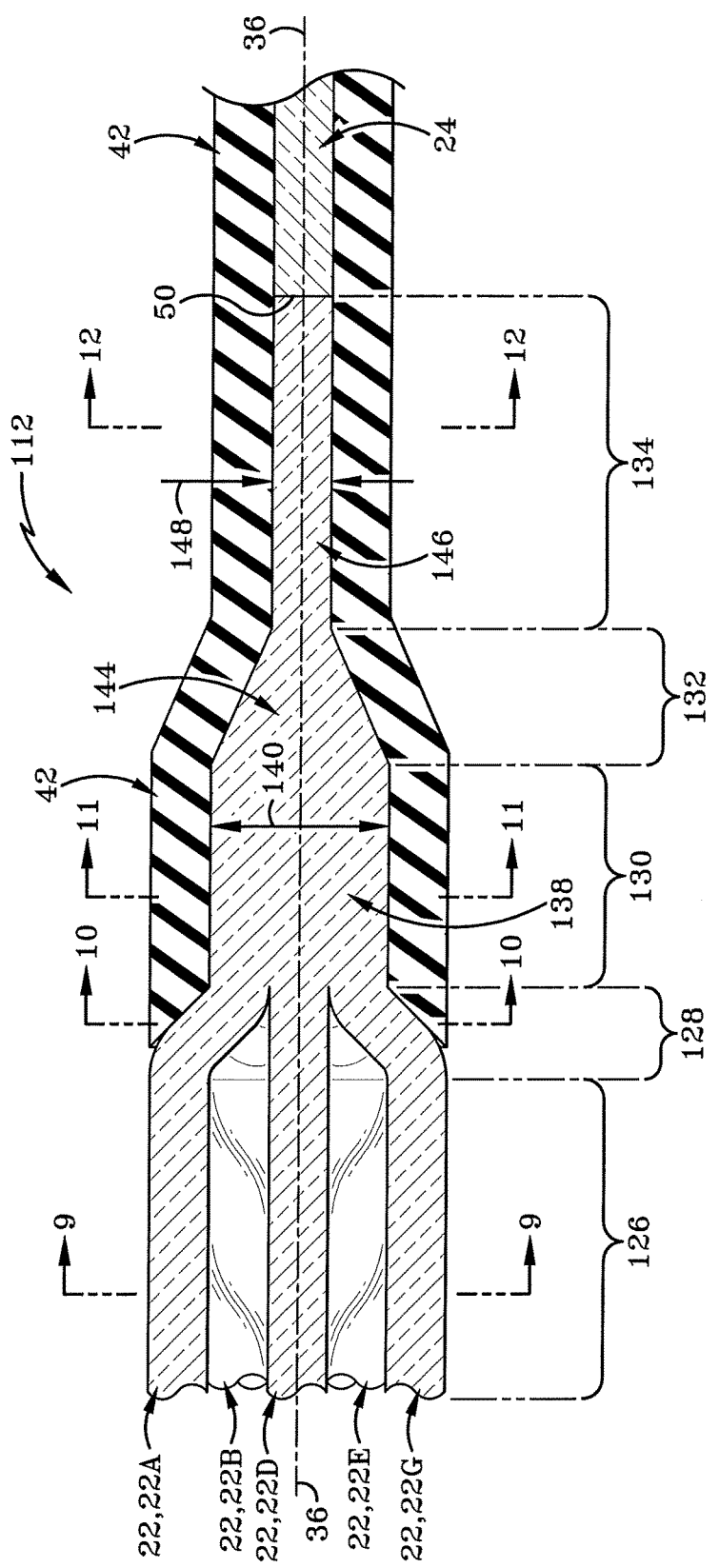

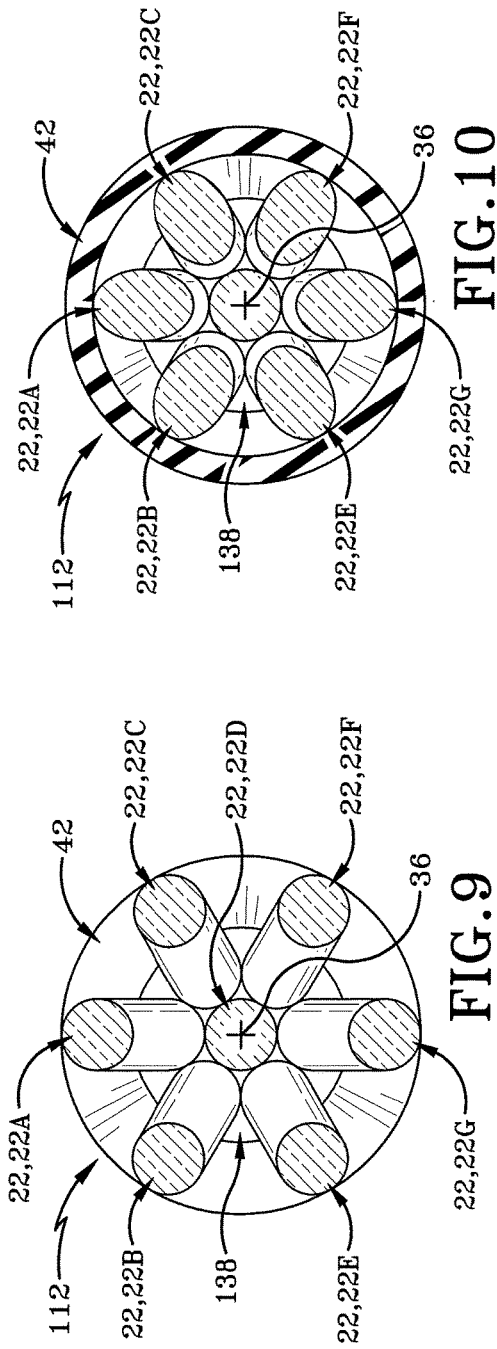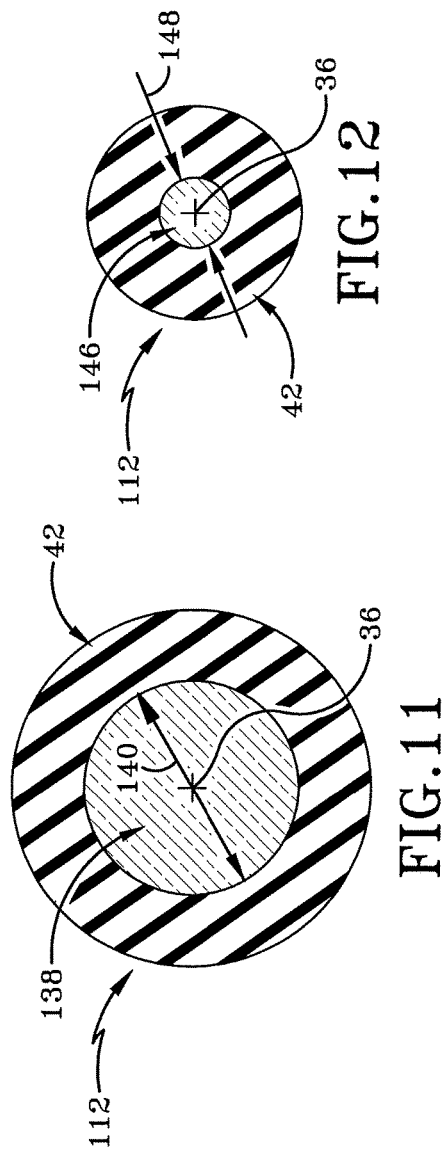

INFRARED FIBER COMBINER

BACKGROUND

Technical Field

The present disclosure relates generally to mid-IR semiconductor light sources. More particularly, the mid-IR semiconductor light sources are optically connected to mid-IR fibers which are combined together in a fused fiber tapered combiner.

Background Information

Mid-infrared (mid-IR) wavelengths in the study of photonics have been at the forefront of recently developed optical applications across a variety fields. For example, in chemical and biological studies, it has been recently realized that fiber-optic materials transparent in the mid-IR spectral region up to wavelengths of 20 μm offer access to fundamental vibrational and rotational fingerprint absorptions of organic molecules. On the other hand, astronomers have utilized mid-IR photonics to advance celestial investigations. In each scenario, a high quality mid-IR optical fiber is needed to advance the utilization of mid-IR technology. Moreover, mid-IR photonics has recently been implemented in military technology. Some mid-IR technology is employed by Blackhawk Helicopters, and may also be utilized in Common Infrared Countermeasures (CIRCM).

Thorlabs Inc. of Newton, N.J., USA ("Thorlabs") is a leading manufacturer of mid-IR optical fibers. Thorlabs offers mid-IR fibers based upon zirconium fluoride (ZrF4) and indium fluoride (InF3) glasses. Thorlabs indicates that these mid-IR fibers feature excellent mechanical flexibility, good environmental stability, and high transmission over the 285 nm-4.5 μm spectral range (for ZrF4) or 310 nm-5.5 μm spectral range (for InF3). Thorlabs additionally indicates that fluoride fibers can be provided in a range of core diameters, cutoff wavelengths, and numerical apertures, suiting a variety of applications.

Thorlabs identified that mid-IR fibers offer a flat attenuation curve in the mid-IR wavelength range and are aided by an extremely low hydroxyl ion content. The mid-IR fiber formed from fluoride (InF3) is stable under typical environmental conditions and humidity. The mid-IR fiber formed from ZrF4 has flatter attenuation than the InF3 fiber in the mid-IR range, while the InF3 fiber is transparent to longer wavelengths.

Thorlabs indicates on its website that the mid-IR fibers they manufacture are either single mode fibers or multimode fibers. Upon information and belief, Thorlabs provides no indication that multiple single mode mid-IR fibers may be combined into a single multimode mid-IR fiber.

SUMMARY

Issues continue to exist with mid-IR fibers in as much as they are only offered in either single mode or multimode fibers. Additionally, emerging mid-IR semiconductor lasers, such as Interband Cascade (IC) and Quantum Cascade (QC) lasers, are proving to be viable sources to meet current and emerging infrared countermeasure (IRCM) needs in military applications. Use of the same requires specific spectral and power needs. Typically, challenges of co-boresight and brightness require merging the outputs of two or more devices (i.e., combining two single mode mid-IR fibers). Thus, a need exist for a mechanism to combine a plurality of single mode mid-IR fibers into at least one multimode mid-IR fiber. The present disclosure addresses these and other issues.

In one aspect, an embodiment of the present disclosure may provide a mid-infrared (IR) fiber combiner comprising: an upstream end opposite a downstream end, wherein energized light travels from the upstream end towards the downstream end; an entrance region; a plurality of mid-IR fibers for transmitting light having wavelengths ranging from about 285 nm to about 5.5 μm, wherein each mid-IR fiber is independent from other mid-IR fibers upstream from the entrance region; a combining region positioned downstream from the entrance region; a fiber bundle in the combining region having a first diameter formed from the plurality of mid-IR fibers compressed together; a tapered region positioned downstream from the combining region, wherein the fiber bundle extends downstream and tapers inwardly in the tapered region; and a narrowed exit region positioned downstream from the tapered region, wherein the fiber bundle has a second diameter in the narrowed exit region, and wherein the second diameter is narrower than the first diameter. A further embodiment may provide a light source operative coupled with the combiner, wherein the light source is a semiconductor laser, such as a QCL or ICL, or alternatively the light source may be a non-linear optical wavelength converting system. A further embodiment may provide wherein the plurality of mid-IR fibers includes: a first single mode or multi-mode mid-IR fiber coupling a first mid-IR semiconductor light source to the entrance region; a second single mode or multi-mode mid-IR fiber coupling a second mid-IR semiconductor light source to the entrance region; a third single mode or multi-mode mid-IR fiber coupling a third mid-IR semiconductor light source to the entrance region; a fourth single mode or multi-mode mid-IR fiber coupling a fourth mid-IR semiconductor light source to the entrance region; a fifth single mode or multi-mode mid-IR fiber coupling a fifth mid-IR semiconductor light source to the entrance region; a sixth single mode or multi-mode mid-IR fiber coupling a sixth mid-IR semiconductor light source to the entrance region; and a seventh single mode or multi-mode mid-IR fiber coupling a seventh mid-IR semiconductor light source to the entrance region. One embodiment may provide a first mid-IR semiconductor light source produces light in having a wavelength in a range from about 1.5 microns to about 1.9 microns; or a second mid-IR semiconductor light source produces light in having a wavelength in a range from about 1.9 microns to about 2.4 microns; or a third mid-IR semiconductor light source produces light in having a wavelength in a range from about 2.9 microns to about 3.4 microns; or a fourth mid-IR semiconductor light source produces light in having a wavelength in a range from about 3.4 microns to about 3.8 microns; or a fifth mid-IR semiconductor light source produces light in having a wavelength in a range from about 3.8 microns to about 4.0 microns; or a sixth mid-IR semiconductor light source produces light in having a wavelength in a range from about 4.0 microns to about 4.2 microns; or a seventh mid-IR semiconductor light source produces light in having a wavelength in a range from about 4.2 microns to about 4.9 microns.

In yet another aspect, an embodiment of the present disclosure may provide a mid-infrared (IR) fiber combiner comprising: an upstream end opposite a downstream end, wherein energized light travels from the upstream end towards the downstream end; an entrance region; a plurality of single mode mid-IR fibers, wherein each single mode mid-IR fiber is independent from other single mode mid-IR fibers upstream from the entrance region; a combining region positioned downstream from the entrance region; a fiber bundle in the combining region having a first diameter formed from the plurality of single mode mid-IR fibers compressed together but remaining optically independent; a tapered region positioned downstream from the combining region, wherein the fiber bundle extends downstream and tapers inwardly in the tapered region; a narrowed exit region positioned downstream from the tapered region, wherein the fiber bundle has a second diameter in the narrowed exit region, and wherein the second diameter is narrower than the first diameter. An embodiment may further provide a low index tube surrounding the fiber bundle in the combining region. An embodiment may further provide wherein the low index tube surrounds the fiber bundle in the tapered region and the narrowed exit region. An embodiment may further provide a plurality of mid-IR semiconductor light sources, wherein one single mode mid-IR fiber couples each one of the plurality of mid-IR semiconductor light sources with the entrance region. An embodiment may further provide wherein the plurality of single mode mid-IR fibers are arranged symmetrically in the entrance region. An embodiment may further provide wherein the plurality of single mode mid-IR fibers are arranged in a hex-packed configuration in the entrance region. An embodiment may further provide wherein there are at least seven single mode mid-IR fibers that are tightly bundled together in the combining region. An embodiment may further provide wherein there are at least nineteen single mode mid-IR fibers that are compressed together in the combining region. An embodiment may further provide a first single mode mid-IR fiber coupling a first mid-IR semiconductor light source to the entrance region; a second single mode mid-IR fiber coupling a second mid-IR semiconductor light source to the entrance region; a third single mode mid-IR fiber coupling a third mid-IR semiconductor light source to the entrance region; a fourth single mode mid-IR fiber coupling a fourth mid-IR semiconductor light source to the entrance region; a fifth single mode mid-IR fiber coupling a fifth mid-IR semiconductor light source to the entrance region; a sixth single mode mid-IR fiber coupling a sixth mid-IR semiconductor light source to the entrance region; and a seventh single mode mid-IR fiber coupling a seventh mid-IR semiconductor light source to the entrance region. An embodiment may further provide a high powered connector spliced downstream from the fused fiber combined exit region, wherein the high powered connector includes an angled exit interface. An embodiment may further provide a multi-mode mid-IR fiber connecting the fused fiber at the combine exist region with the high powered connector.

In accordance with one aspect of the present disclosure, an embodiment may provide a light system which may include a fused mid-IR tapered combiner to optically connect a bundle of mid-IR fiber bundles with a single multimode fiber. The fused mid-IR fiber tapered combiner arranges a bundle of fibers in a geometric arrangement to reduce the diameter of a plurality of mid-IR fibers to match or equal the diameter of a single multimode mid-IR fiber so the bundle may be abutted and splice therewith. The mid-IR fibers carry light produced and emitted from semiconductor light sources In one aspect, an embodiment of the present disclosure may provide a fused fiber tapered combiner using mid-IR fibers to combine at least two semiconductor laser fibers or semiconductor multi-emitter laser modules into one multimode fiber. In some instances, at least seven single mode mid-IR fibers are combines and arranged in a hex-packing geometry having a central fiber with six fibers hexagonally arranged around the central fiber (for seven total fibers). In this instance, of the at least seven fibers (or modules) one may operate at Band 1, one may operate at Band 2, three (or two) may operate at Band 4a, and two (or three) may operate at Band 4b. The additional of another ring of fibers could increase this to a total of nineteen mid-IR fibers to be combined (12 outermost fibers+6 intermediate fibers+1 central fiber arranged in a hex-packing configuration). The fused fiber tapered combiner has volume, and parts count advantages to current free space methods. The advantages lead to cost savings advantages as well. The fused fiber tapered combiner should be beneficial for combining light from several different mid-IR sources so they may be collectively routed to a beam director that is co-located with a missile warning sensor. This configuration thereby enables a headless IRCM system. In more general terms, this fused fiber tapered combiner could also be used in reverse as a splitter for mid-IR light. The fused fiber tapered combiner could also be coupled with a wave guide structure which may be collectively utilized as mid-IR splitters, taps, and with some electro-optic or piezo-optics effects made into a mid-IR fiber based optical switch.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 4 is a transverse cross section taken along line 4-4 in FIG. 3.

FIG. 5 is a transverse cross section taken along line 5-5 in FIG. 3.

FIG. 6 is a transverse cross section taken along line 6-6 in FIG. 3.

FIG. 7 is a transverse cross section taken along line 7-7 in FIG. 3.

FIG. 8 is a longitudinal cross section of a second embodiment of a fused fiber tapered combiner.

FIG. 9 is a transverse cross section taken along line 9-9 in FIG. 8.

FIG. 10 is a transverse cross section taken along line 10-10 in FIG. 8.

FIG. 11 is a transverse cross section taken along line 11-11 in FIG. 8.

FIG. 12 is a transverse cross section taken along line 12-12 in FIG. 8.

Similar numbers refer to similar parts throughout the drawings.

DETAILED DESCRIPTION

Figure 1:
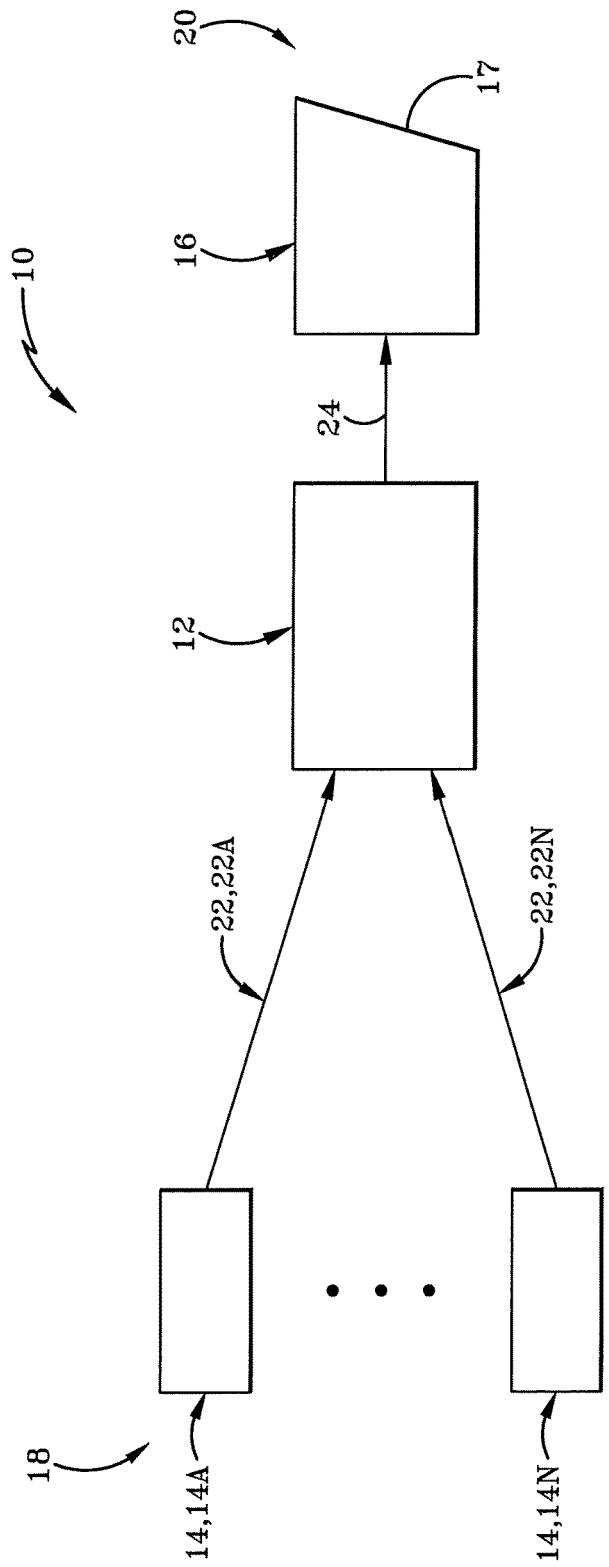
FIG. 1 is a general schematic of a laser system having a fused fiber tapered combiner.

FIG. 1 depicts a laser system in accordance with the present disclosure and is shown generally at 10. Laser system 10 may include a fused fiber tapered combiner 12, a plurality of laser sources 14, and a connector 16. Laser system 10 may further include an upstream end 18 and a downstream end 20 such that laser beams or amplified light moves or flows from the upstream end 18 towards the downstream end 20. The terms upstream and downstream are not intended to be limiting and are used herein for descriptive purposes as one having ordinary skill in the art would understand to describe the directional movement of light in order to describe various components of laser system 10 relative to other components within the same system. The sources 14 are positioned upstream relative to the fused fiber tapered combiner 12. The connector 16 is positioned downstream from the fused fiber tapered combiner 12. Stated otherwise, the fused fiber tapered combiner 12 is positioned intermediate the sources 14 and the connector 16. The connector 16 in one embodiment is an end cap having an angled exit interface 17.

With continued reference to FIG. 1, the system 10 includes a plurality of sources 14 which may be any number greater than or equal to two. In one particular embodiment, each light source within the plurality of light sources is a semiconductor light source. A first source 14A and at least a second source 14N are both upstream of the fused fiber tapered combiner 12. As one having ordinary skill in the art would understand, the at least second source 14N can be any number of sources, such that "N" refers to any integer of two or more. For example, as will be described in greater detail below, there may be seven semiconductor light sources, or there may be nineteen semiconductor light sources, and so on.

The sources 14 are each respectively coupled with the fused fiber tapered combiner 12 with mid-IR fibers 22. Mid-IR fibers 22 may be either single mode fibers or multi-mode fibers. The main reason for this is that many Quantum Cascade Laser (QCL) and Interband Cascade Lasers (ICL) semiconductor laser sources 14 are only single mode in one axis—so in order to get good light coupling efficiency into the input fibers of the combiner, the input mid-IR fibers 22 may need to be multi-mode as well.

Moreover, as mid-IR fiber lasers are currently under development and are already in a fiber format, the sources 14 producing light transmitted along fibers 22 also includes, transmitted light from a Non-linear optical (NLO) wavelength converting system (i.e., another type of source 14). Exemplarily NLO wavelength converting systems include but are not limited to Raman, Brillouin, Parametric Upconversion or Down Conversion, Harmonic Frequency Generation, etc., as one skilled in the art would understand.

In one implementation, a first single mode or multi-mode mid-IR fiber 22A connects the first source 14A with the fused fiber tapered combiner 12. An at least second single-mode or multi-mode mid-IR fiber 22N couples the at least second source 14N to the fused fiber tapered combiner 12. The mid-IR fibers 22 are connected with the upstream end of fused fiber tapered combiner 12. The downstream end of fused fiber tapered combiner 12 is connected with a multi-mode mid-IR fiber. Mid-IR fibers 22 may be fabricated from Zirconium Fluoride (ZrF4) or Indium Fluoride (InF3) glasses or the like. The multi-mode mid-IR fiber 24 is connected with the upstream end of connector 16.

Figure 2:
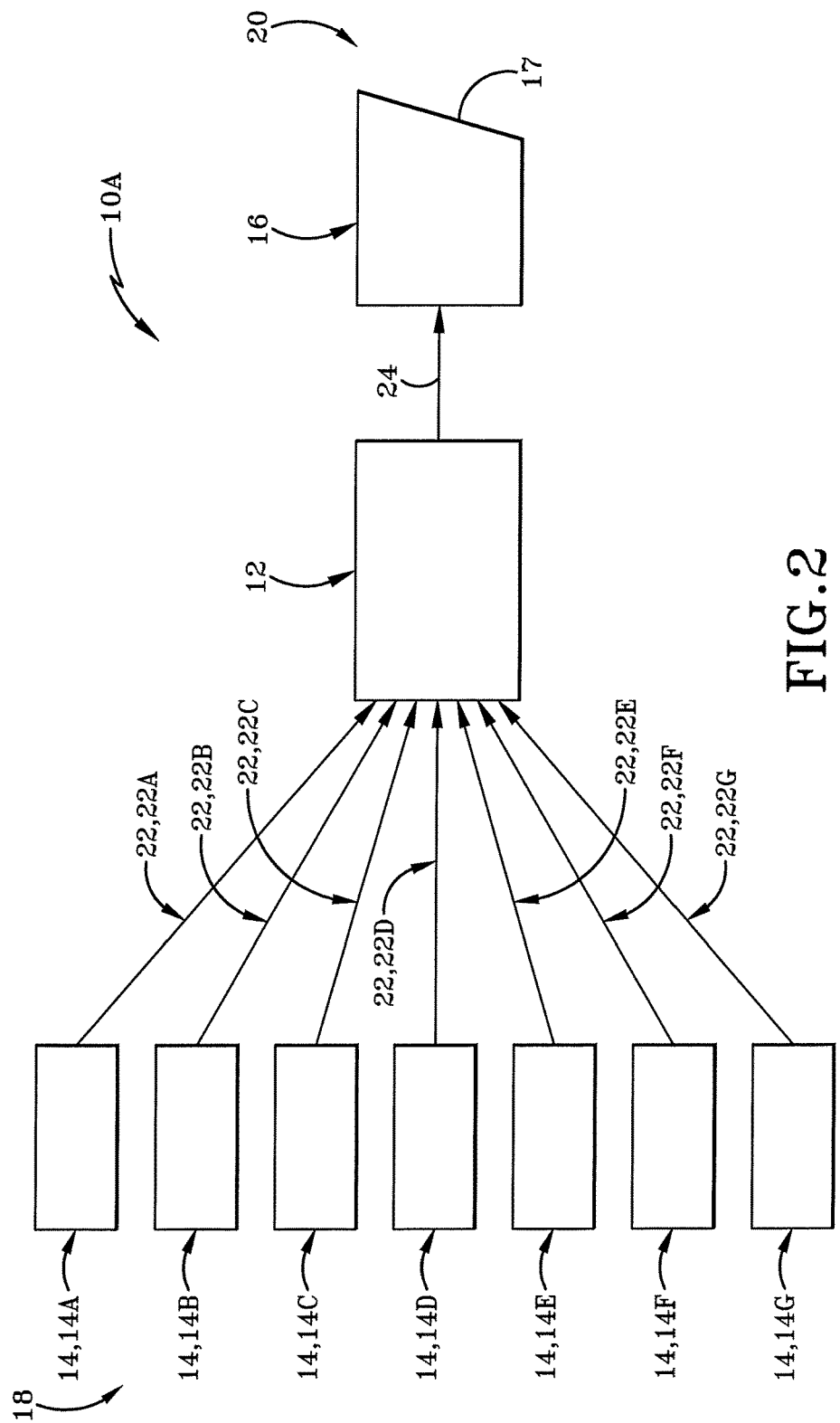
FIG. 2 is a general schematic of one embodiment of a laser system having the fused fiber tapered combiner.

FIG. 2 schematically depicts one embodiment of a laser system 10A in accordance with the present disclosure. Laser system 10A may include at least seven semiconductor sources 14 positioned upstream from the fused fiber tapered combiner 12. More particularly, laser system 10A includes a first source 14A, a second source 14B, a third source 14C, a fourth source 14D, a fifth source 14E, a sixth source 14F, and a seventh source 14G. In one particular example, the seven semiconductor laser sources are QCL or ICL lasers.

The first source 14A is coupled with the upstream end of the fused fiber tapered combiner 12 by a first single mode or multi-mode mid-IR fiber 22A. The second source 14B is coupled with the upstream end of the fused fiber tapered combiner 12 by a second single mode or multi-mode mid-IR fiber 22B. The third source 14C is coupled with the upstream end of the fused fiber tapered combiner 12 by a third single mode or multi-mode mid-IR fiber 22C. The fourth source 14D is coupled with the upstream end of the fused fiber tapered combiner 12 by a fourth single mode or multi-mode mid-IR fiber 22D. The fifth source 14E is coupled with the upstream end of the fused fiber tapered combiner 12 by a fifth single mode or multi-mode mid-IR fiber 22E. The sixth source 14F is coupled with the upstream end of the fused fiber tapered combiner 12 by a sixth single mode or multi-mode mid-IR fiber 22F. The seventh source 14G is coupled with the upstream end of the fused fiber tapered combiner 12 by a seventh single mode or multi-mode mid-IR fiber 22G. Each of the single mode or multi-mode mid-IR fibers 22A-22G are independent and distinct upstream from the entrance or upstream end of the fused fiber tapered combiner 12. However, it is to be understood that other embodiments may provide the possibility of some fibers being combined upstream from the combiner 12.

For laser system 10A, the semiconductor light sources 14A-14G may output light having wavelengths in desired mid-IR ranges. In one particular embodiment, the first semiconductor light source 14A produces and emits light having a wavelength in a range from about 1.5 microns to about 1.9 microns along fiber 22A. The second semiconductor light source 14B produces and emits light having a wavelength in a range from about 1.9 microns to about 2.4 microns along fiber 22B. The third semiconductor light source 14C produces and emits light having a wavelength in a range from about 2.9 microns to about 3.4 microns along fiber 22C. The fourth semiconductor light source 14D produces and emits light having a wavelength in a range from about 3.4 to about 3.8 microns along fiber 22D. The fifth semiconductor light source 14E produces and emits light having a wavelength in a range from about 3.8 microns to about 4.0 microns along fiber 22E. The sixth semiconductor light source 14F produces and emits light having a wavelength in a range from about 4.0 microns to about 4.2 microns along fiber 22F. The seventh semiconductor light source 14G produces and emits light having a wavelength in a range from about 4.2 microns to about 4.9 microns along fiber 22G. Thus, fibers 22A-22G collectively transmit light in a mid-IR range from about 1.5 microns to about 4.2 microns.

The fused fiber tapered combiner 12 is generally utilized to combine seven semiconductor lasers or seven semiconductor multi-emitter laser modules. Fused fiber tapered combiner 12 provides volume, mass, and parts-count advantages to free space methods of operating the laser system 10A. These advantages may lead to cost savings as well for the manufacture and operation of the laser system.

Figure 3:
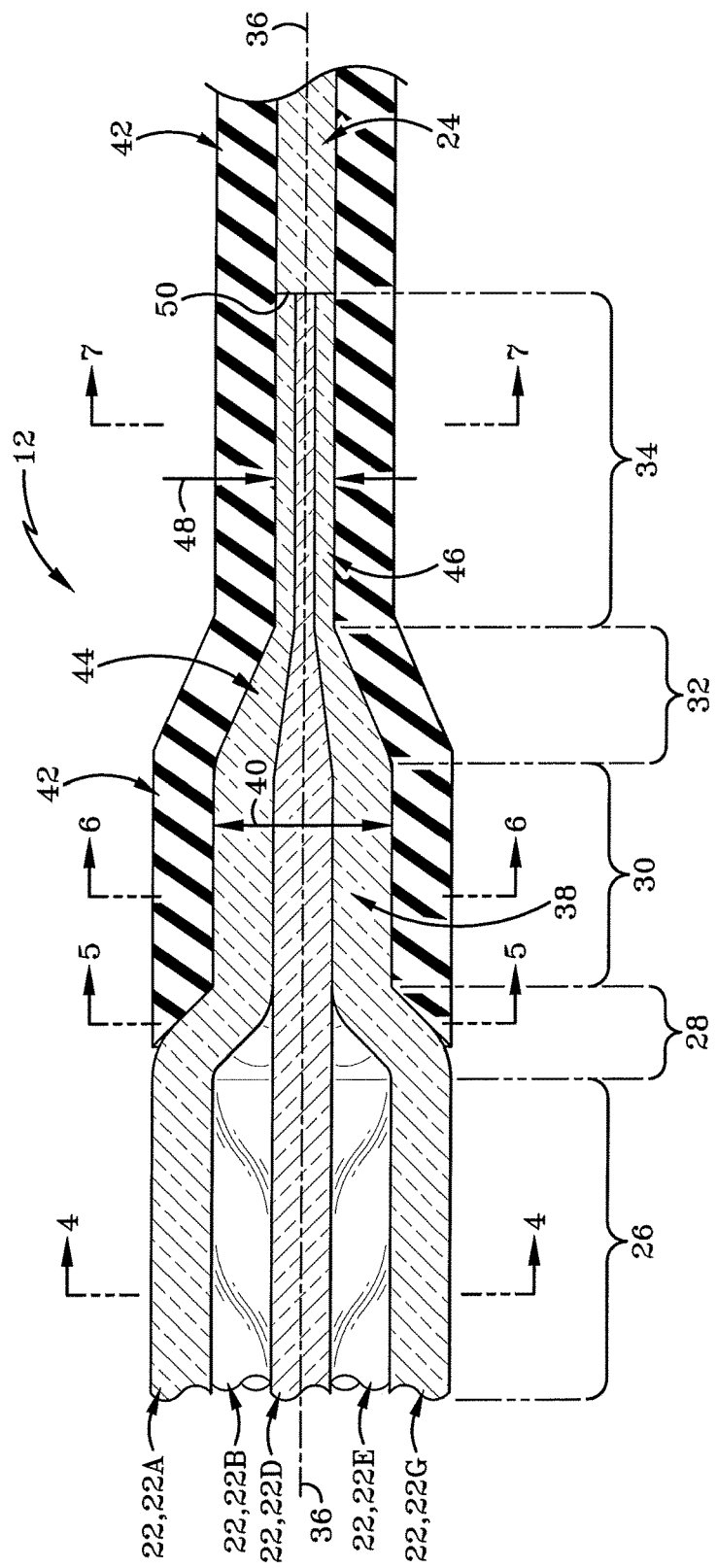
FIG. 3 is a longitudinal cross section of a first embodiment of a fused fiber tapered combiner.

FIG. 3 depicts the fused fiber tapered combiner 12 in cross section for the embodiment of FIG. 2 having seven fibers 22A-22G. The fused fiber tapered combiner 12 may include an entrance region 26, a first tapering region 28, a combining region 30, a second tapering region 32, and a narrowed exit region 34. The aforementioned regions are oriented from upstream to downstream in the following manner: the entrance region 26, the first tapering region 28, the combining region 30, the second tapering region 32, and the narrowed exit region 34.

Within the entrance region 26, the seven fibers 22A-22G are independent and distinct. Note, the cross section of FIG. 3 depicts the first fiber 22A, the fourth fiber 22D, and the seventh fiber 22G. The second fiber 22B and the fifth fiber 22E are shown in the background whereas the third fiber 22C and the sixth fiber 22F are not depicted but are to be understood as being positioned in front of the page relative to the first fiber 22A, the fourth fiber 22D, and the seventh fiber 22G.

The first tapering region 28 is positioned downstream from the entrance region 26. Within the first tapering region 28, the seven fibers 22A-22G taper inwardly towards an imaginary longitudinal axis 36. The fibers 22A-22G are compressed together physically in the first tapering region 28 but remain optically independent and distinct.

The combining region 30 is positioned downstream from the first tapering region 28. Within the combining region 30, the seven fibers 22A-22G are compressed together to form a compressed fiber bundle 38 having a first diameter 40. Compressed fiber bundle 38 within combining region 30 is surrounded by a low index tube 42 which extends entirely around compressed fiber bundle 38. In some implementations, the low index tube 42 extends downstream from first tapering region 28 towards the combined exit region 34. The mid-IR fibers defining the compressed fiber bundle 30 are optically independent and distinct, but are in close contact.

Within the second tapering region 32, the compressed fiber bundle 38 tapers to thereby define a tapered portion of fiber bundle 44 surrounded by a tapering portion of the low index tube 42. The tapering angle which defines the tapering portion of fiber bundle 44 may be in a range of 1° to 80° relative to the longitudinal axis 36. In some implementations, the tapering angle of the second tapering section 32 is less than 45° and may be less than 22.5°. The low index tube 42 is in direct contact with the exterior surface of the tapering portion of the tapering fiber bundle 44 along its entire longitudinal length within the second tapering section 32.

The narrowed exit region 34 is downstream from the second tapering region 32 and defines a narrow fiber bundle 46 that is narrower and has a second diameter 48. Notably, the second diameter 48 is smaller than the first diameter 40. The low index tube 42 surrounds the narrow fiber bundle 46 along the entire length of the combined exit region 34 and may be spliced via splice 50 to the multi-mode fiber 24. Splice 50 is preferably a butt-splice such that the seven independent and distinct fibers of the narrowed bundle portion 46 directly abut a multimode mid-IR optical fiber 24. The low index tube 42 may further surround the multi-mode fiber 24 along its longitudinal length. The second diameter 48 of the narrowed fiber bundle 46 is equal to the diameter of the multi-mode fiber 24.

The mid-IR multi-mode fiber 24 may have a core that is larger than the fibers forming the narrowed bundle portion 46. The larger core of mid-IR multi-mode fiber 24 establishes good coupling efficiency into the final output fiber (i.e., fiber 24) from the many input fibers (i.e., narrowed bundle portion 46). The core of mid-IR multi-mode fiber 24 has a uniform diameter downstream from the narrowed bundle portion 46.

FIG. 4 depicts a transverse cross section of the seven single mode mid-IR fibers 22A-22F arranged in a hex-packing geometry such that the fourth fiber 22D is positioned centrally along the longitudinal axis 36. The first single mode or multi-mode mid-IR fiber 22A, second single mode or multi-mode mid-IR fiber 22B, the third single mode or multi-mode mid-IR fiber 22C, the fifth single mode or multi-mode mid-IR fiber 22E, the sixth single mode or multi-mode mid-IR fiber 22F, and the seventh single mode or multi-mode mid-IR fiber 22G are positioned around the fourth single mode or multi-mode mid-IR fiber 22E. This arrangement may be thought of as a concentric arrangement with the fourth fiber 22D located centrally. Alternatively, this may be considered a planetary arrangement where some fibers are positioned around a central fiber. The term hex-packing refers to six outer fibers plus one central fiber, for a total of seven fibers.

FIG. 5 depicts the low index tube 42 surrounding the seven fibers 22A-22G arranged in the hex-packing arrangement described above. Because the fourth fiber 22D is central within the hex-packing configuration, low index tube 42 does not contact the fourth fiber 22D. Low index tube 42 does contact the outermost point of the outer fibers in a tangential manner. The tangential contact of the low index tube 42 with the outermost fibers defines small spaces between adjacent fibers and the low index tube 42.

While FIG. 4 and FIG. 5 depict the seven fibers that are equally sized and have the same diameter, it is to be understood that asymmetric geometries are entirely possible or other symmetric geometries are possible where some fibers have different diameters than other fibers.

FIG. 6 depicts the cross section of the combined fiber bundle 38 within the combining region 38. The combined fiber bundle 38 reduces the free space separating the individual fibers 22A-22G. The individual mid-IR fibers may retain a diameter that is generally similar to those within the entrance region 26. The hex-packing configuration of the seven mid-IR fibers 22A-22G define a closely and tightly packed arrangement such that some of the outer surface of an individual fiber contacts adjacent fibers.

FIG. 7 depicts the cross section of the narrowed fiber bundle 46 within the narrowed exit region 34. The narrowed fiber bundle 46 significantly reduces the free space separating the individual fibers 22A-22G. After being tapered, the individual mid-IR fibers 22A-22G have smaller diameters than in region 38. In one embodiment the individual fibers diameter may be decrease by approximately 85% from the combining region 38 to the narrowed exit region 46. The hex-packing configuration of the seven mid-IR fibers 22A-22G define a closely and tightly packed arrangement such that a significant majority of the outer surface of an individual fiber contacts adjacent fibers. The tapering of fibers 22A-22G may be accomplished in any known manner such as heating and stretching/pulling the fibers 22A-22G to define the narrowed fiber bundle 46.

In accordance with the present disclosure, another version may provide an alternative embodiment of a fused fiber tapered combiner 112 which could also be generally utilized to combine seven semiconductor lasers or seven semiconductor multi-emitter laser modules. Fused fiber tapered combiner 112 provides volume, mass, and parts-count advantages to free space methods of operating the laser system 10A. These advantages may lead to cost savings as well for the manufacture and operation of the laser system.

FIG. 8 depicts the fused fiber tapered combiner 112 in cross section for the embodiment of FIG. 2 having seven fibers 22A-22G. The fused fiber tapered combiner 112 may include an entrance region 126, a first tapering region 128, a combining region 130, a second tapering region 132, and a combined exit region 134. The aforementioned regions are oriented from upstream to downstream in the following manner: the entrance region 126, the first tapering region 128, the combining region 130, the second tapering region 132, and the combined exit region 134.

Within the entrance region 126, the seven fibers 22A-22G are optically independent and distinct. Note, the cross section of FIG. 8 depicts the first fiber 22A, the fourth fiber 22D, and the seventh fiber 22G. The second fiber 22B and the fifth fiber 22E are shown in the background whereas the third fiber 22C and the sixth fiber 22F are not depicted but are to be understood as being positioned in front of the page relative to the first fiber 22A, the fourth fiber 22D, and the seventh fiber 22G.

The first tapering region 128 is positioned downstream from the entrance region 126. Within the first tapering region 128, the seven fibers 22A-22G taper inwardly towards an imaginary longitudinal axis 36. The fibers 22A-22G are fused (i.e., melted) together physically in the first tapering region 28. The fibers 22A-22G are initially combined in the first tapering region 28.

The combining region 130 is positioned downstream from the first tapering region 128. Within the combining region 30, the seven fibers 22A-22G are fused together to form a single combined fiber 138 having a first diameter 140. Combined fiber 138 within combining region 130 is surrounded by a low index tube 42 which extends entirely around combined fiber 138. In some implementations, the low index tube 42 extends downstream from first tapering region 128 towards the combined exit region 134. The combined fiber 138 is optically uniform with the previous fibers that were fused and melted together.

Within the second tapering region 132, the fused fiber tapers to thereby define a tapered portion of fiber 144 surrounded by a tapering portion of the low index tube 42. The tapering angle which defines the tapering portion of fiber 144 may be in a range of 1° to 80° relative to the longitudinal axis 36. In some implementations, the tapering angle of the second tapering section 132 is less than 45° and may be less than 22.5°. The low index tube 42 is in direct contact with the exterior surface of the tapering portion of the fiber 144 along its entire longitudinal length within the second tapering section 132.

The combined exit region 134 is downstream from the second tapering region 32 and the combined portion 146 of the fiber is narrower and has a second diameter 148. Notably, the second diameter 148 is smaller than the first diameter 140. The low index tube 42 surrounds the combined portion of the fiber 146 along the entire length of the combined exit region 134 and may be spliced via butt splice 50 to the multi-mode fiber 24. The low index tube 42 may further surround the multi-mode fiber 24 along its longitudinal length. The core of multi-mode fiber 24 may be equal to or larger than second diameter 148.

FIG. 9 depicts a transverse cross section of the seven single mode or multi-mode mid-IR fibers 22A-22F arranged in a hex-packing geometry such that the fourth fiber 22D is positioned centrally along the longitudinal axis 36. The first single mode or multi-mode mid-IR fiber 22A, second single mode or multi-mode mid-IR fiber 22B, the third single mode or multi-mode mid-IR fiber 22C, the fifth single mode or multi-mode mid-IR fiber 22E, the sixth single mode or multi-mode mid-IR fiber 22F, and the seventh single mode or multi-mode mid-IR fiber 22G are positioned around the fourth single mode or multi-mode mid-IR fiber 22E. This arrangement may be thought of as a concentric arrangement with the fourth fiber 22D located centrally. Alternatively, this may be considered a planetary arrangement where some fibers are positioned around a central fiber. The term hex-packing refers to six outer fibers plus one central fiber, for a total of seven fibers.

FIG. 10 depicts the low index tube 42 surrounding the seven fibers 22A-22G arranged in the hex-packing arrangement described above. Because the fourth fiber 22D is central within the hex-packing configuration, low index tube 42 does not contact the fourth fiber 22D. Low index tube 42 does contact the outermost point of the outer fibers in a tangential manner. The tangential contact of the low index tube 42 with the outermost fibers defines small spaces between adjacent fibers and the low index tube 42.

While FIG. 9 and FIG. 10 depict the seven fibers that are equally sized and have the same diameter, it is to be understood that asymmetric geometries are entirely possible or other symmetric geometries are possible where some fibers have different diameters than other fibers. For example, the central fourth fiber 22D may have a larger first diameter, while the remaining fibers 22A-C, and 22E-G have a smaller second diameter.

FIG. 11 depicts the cross section of the combined portion of the fiber 138 in direct contact with the low index tube 42 around the entire circumference of its outer edge. Furthermore, the combined portion of the fiber 138 having the first diameter 140. The combined fiber 138 is fused together to define one single fiber fused (i.e., melted) together from the seven distinct fibers. Stated otherwise, fused fiber tapered combiner 112 physically combines seven distinct mid-IR fibers and melts them into one fiber having diameter 140.

FIG. 12 depicts the cross section of the narrowed portion of the combined fiber at 146. The narrowed portion of the combined fiber has the narrowed diameter 148 which is generally equal to that of multimode fiber 24. The narrowed fiber 146 may be achieved by heating and stretching the combined fiber 138.

In accordance with the present disclosure, each embodiment of the fused fiber tapered combiner 12, 112 of the present disclosure accomplishes emerging needs for infrared counter measure (IRCM) systems. Particularly, mid-IR semiconductor lasers such as ICL and QCL lasers are viable sources to meet the current IRCM needs. Particularly, these mid-IR semiconductor lasers are useful inasmuch as they meet spectral and power needs for IRCM laser systems. Fused fiber tapered combiner 12 or 112 accomplishes and overcomes some of the challenges ordinarily present for the merging of co-boresight and brightness requirements during the merger of the outputs of two or more mid-IR semiconductor laser devices. The fused fiber tapered combiner 12 or 112 has further proved to be beneficial by enabling a headless laser jammer which was the subject of the Ichabod Project (Empower 3090) for BAE Systems. The fused fiber tapered combiner 12 or 112 used in the headless jammer system Ichabod Project did not require the output beam to have a high brightness as is required in direct infrared countermeasure systems, thus allowing the output fiber (portion 46 or 146) to be multimode as indicated above in FIG. 3 or FIG. 8.

Furthermore, while combiner(s) 12, 112 are envisioned for mid-IR light from sources 14 transmitted along mid-IR fibers 22, it is also possible for the technology of the present disclosure to apply towards light within the Long Wave region. In this instance, optical fibers carry long wave (6-20 micron) light, and then the long wave optical fibers may be combined in a structurally similar combiner as 12, 112. As Long Wave QCL's are already in use for covert pointer applications in prototypes developed by BAE Systems. As such, long wave optical fiber combiners would be a natural expansion to address the needs of laser applications in this long wave spectral region.

The term "mid-IR" refers to the spectral region for light wavelengths ranging from about 285 nm to about 5.5 μm. Typically, the mid-IR wavelength range is 285 nm-4.5 μm spectral range for fibers 22 fabricated from ZrF4. Additionally, the mid-IR wavelength range is 310 nm-5.5 µm spectral range for fibers 22 fabricated from InF3.

An embodiment is an implementation or example of the present disclosure. Reference in the specification to "an embodiment," "one embodiment," "some embodiments," or "other embodiments" means that a particular feature, structure, or characteristic described in connection with the embodiments is included in at least some embodiments, but not necessarily all embodiments, of the present disclosure. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

What is claimed:

1. A mid-infrared (IR) fiber combiner comprising:
   an upstream end opposite a downstream end, wherein energized light travels from the upstream end towards the downstream end;
   an entrance region;
   a plurality of mid-IR fibers for transmitting light having wavelengths ranging from about 285 nm to about 5.5 µm, wherein each mid-IR fiber is independent from other mid-IR fibers upstream from the entrance region;
   a first tapering region positioned downstream from the entrance region, wherein the plurality of mid-IR fibers taper inwardly towards a longitudinal axis, wherein each mid-IR fibers is independent from other mid-IR fibers in the first tapering region;
   a combining region positioned downstream from the first tapering region;
   a fiber bundle in the combining region having a first diameter formed from the plurality of mid-IR fibers compressed together, wherein each mid-IR fiber in the fiber bundle is independent from other mid-IR fibers in the combining region;
   a second tapering region positioned downstream from the combining region, wherein the fiber bundle extends downstream and tapers inwardly towards the longitudinal axis in the second tapering region, wherein each mid-IR fiber in the fiber bundle is independent from other mid-IR fibers in the tapered region; and
   a narrowed exit region positioned downstream from the second tapering region, wherein the fiber bundle has a second diameter in the narrowed exit region defining a narrowed bundle portion, and wherein the second diameter is narrower than the first diameter, wherein each mid-IR fiber in the narrowed bundle portion is independent from other mid-IR fibers in the narrowed exit region.

2. The mid-IR fiber combiner of claim 1, further comprising:
   a low index tube surrounding the fiber bundle in the combining region; and
   a multi-mode mid-IR fiber abuttingly spliced with the fiber bundle at the narrowed exit region, wherein a core of the multi-mode mid-IR fiber has a uniform diameter downstream from the narrowed bundle portion.

3. The mid-IR fiber combiner of claim 2, wherein the low index tube surrounds the fiber bundle in the second tapering region and the narrowed exit region.

4. The mid-IR fiber combiner of claim 1, in combination with an infrared countermeasure system (IRCM), wherein the combination comprises:
   a plurality of mid-IR semiconductor light sources, wherein one mid-IR fiber couples each one of the plurality of mid-IR semiconductor light sources with the entrance region.

5. The combination of claim 4, wherein the plurality of mid-IR fibers are arranged symmetrically in the entrance region.

6. The combination of claim 5, wherein the plurality of mid-IR fibers are arranged in a hex-packed configuration in the entrance region.

7. The combination of claim 4, wherein there are at least seven mid-IR fibers that are tightly bundled together in the combining region.

8. The combination of claim 7, wherein there are at least nineteen single mode mid-IR fibers that are compressed together in the combining region.

9. The combination of claim 4, wherein the plurality of mid-IR fibers includes:
   a first single mode or multi-mode mid-IR fiber coupling a first mid-IR semiconductor light source to the entrance region;
   a second single mode or multi-mode mid-IR fiber coupling a second mid-IR semiconductor light source to the entrance region;
   a third single mode or multi-mode mid-IR fiber coupling a third mid-IR semiconductor light source to the entrance region;
   a fourth single mode or multi-mode mid-IR fiber coupling a fourth mid-IR semiconductor light source to the entrance region;
   a fifth single mode or multi-mode mid-IR fiber coupling a fifth mid-IR semiconductor light source to the entrance region;
   a sixth single mode or multi-mode mid-IR fiber coupling a sixth mid-IR semiconductor light source to the entrance region; and
   a seventh single mode or multi-mode mid-IR fiber coupling a seventh mid-IR semiconductor light source to the entrance region.

10. The combination of claim 9, wherein the first mid-IR semiconductor light source produces light in having a wavelength in a range from about 1.5 microns to about 1.9 microns.

11. The combination of claim 9, wherein the second mid-IR semiconductor light source produces light in having a wavelength in a range from about 1.9 microns to about 2.4 microns.

12. The combination of claim 9, wherein the third mid-IR semiconductor light source produces light in having a wavelength in a range from about 2.9 microns to about 3.4 microns.

13. The combination of claim 9, wherein the fourth mid-IR semiconductor light source produces light in having a wavelength in a range from about 3.4 microns to about 3.8 microns.

14. The combination of claim 9, wherein the fifth mid-IR semiconductor light source produces light in having a wavelength in a range from about 3.8 microns to about 4.0 microns.

15. The combination of claim 9, wherein the sixth mid-IR semiconductor light source produces light in having a wavelength in a range from about 4.0 microns to about 4.2 microns.

16. The combination of claim 9, wherein the seventh mid-IR semiconductor light source produces light in having a wavelength in a range from about 4.2 microns to about 4.9 microns.

17. The combination of claim 4, further comprising a high powered connector spliced downstream from the narrowed exit region, wherein the high powered connector includes an angled exit interface.

18. The combination of claim 17, further comprising a multi-mode mid-IR fiber abutted with the fiber bundle at the narrowed exit region, wherein the multi-mode mid-IR fiber has a uniform diameter.

19. The mid-IR fiber combiner of claim 1, wherein the plurality of mid-IR fibers are formed from a material selected from the group comprising Zirconium Fluoride ($ZrF_4$) and Indium Fluoride ($InF_4$).

20. The mid-IR fiber combiner of claim 19, wherein the mid-IR fibers only transmit light in a range from 1.5 microns to 4.2 microns.

\* \* \* \* \*